United States Patent
Weidenfeller

(10) Patent No.: US 9,578,360 B2
(45) Date of Patent: Feb. 21, 2017

(54) INFORMATION PRESENTATION DEVICE AND METHOD

(71) Applicant: TELEFONAKTIEBOLAGET LM ERICSSON (PUBL), Stockholm (SE)

(72) Inventor: Thomas Weidenfeller, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/088,270

(22) Filed: Apr. 1, 2016

(65) Prior Publication Data

US 2016/0219318 A1 Jul. 28, 2016

Related U.S. Application Data

(63) Continuation of application No. 10/237,461, filed on Sep. 9, 2002, now abandoned.

(30) Foreign Application Priority Data

Sep. 10, 2001 (EP) .................................... 01120783

(51) Int. Cl.
  *H04N 7/16* (2011.01)
  *H04N 21/2543* (2011.01)
  (Continued)

(52) U.S. Cl.
  CPC .......... *H04N 21/2543* (2013.01); *H04L 29/06* (2013.01); *H04L 29/06027* (2013.01);
  (Continued)

(58) Field of Classification Search
  CPC .............. H04N 21/2543; H04N 21/266; H04N 21/44008; H04N 21/44209; H04N 21/6583; H04N 21/8358
  (Continued)

(56) References Cited

U.S. PATENT DOCUMENTS 4,905,234 A * 2/1990 Childress .................. H04L 1/08
  370/349
5,010,405 A * 4/1991 Schreiber ............... H04N 7/007
  348/432.1
(Continued)

FOREIGN PATENT DOCUMENTS

EP   0 796 014 A1   9/1997
EP   1 033 678 A1   6/2000
(Continued)

OTHER PUBLICATIONS

Aiko Pras, Bert-Jan van Beijnum, Ron Sprenkels, and Robert Parhonyi, "Internet Accounting", pp. 108-113, IEEE Communications Magazine, May 2001, pp. 108-113.*

(Continued)

*Primary Examiner* — Nathan Flynn
*Assistant Examiner* — Alfonso Castro

(57) ABSTRACT

An information presentation device for presenting information to a user is described, which is arranged to receive information transmissions from a remote information source, and comprises: an information transmission receiver for receiving information transmissions, an information extractor for extracting presentation information to be presented, from an information transmission, an information presenter for presenting the extracted presentation information, wherein a monitor is arranged to monitor the operation of one or more of the information extractor and the information presenter, determine whether the operation of one or more of the information extractor and the information presenter fulfills one or more predetermined conditions, and generate an operation condition signal destined for the remote information source, said operation condition signal conveying an indication of the fulfillment or non-fulfillment of said one or more conditions.

5 Claims, 2 Drawing Sheets

(51) Int. Cl.
*H04L 29/06* (2006.01)
*H04N 21/2662* (2011.01)
*H04N 21/44* (2011.01)
*H04N 21/442* (2011.01)
*H04N 21/658* (2011.01)
*H04N 21/266* (2011.01)
*H04N 21/6583* (2011.01)
*H04N 21/8358* (2011.01)
*H04L 29/08* (2006.01)

(52) U.S. Cl.
CPC ...... *H04L 65/1009* (2013.01); *H04L 65/4092* (2013.01); *H04N 21/266* (2013.01); *H04N 21/2662* (2013.01); *H04N 21/44008* (2013.01); *H04N 21/44209* (2013.01); *H04N 21/6582* (2013.01); *H04N 21/6583* (2013.01); *H04N 21/8358* (2013.01); *H04L 69/329* (2013.01)

(58) Field of Classification Search
USPC .............................................................. 725/1
See application file for complete search history.

(56) References Cited

U.S. PATENT DOCUMENTS

| | | | |
|---|---|---|---|
| 5,619,247 A * | 4/1997 | Russo | G06Q 20/145 348/E7.07 |
| 5,872,588 A * | 2/1999 | Aras | H04N 7/17354 348/E7.075 |
| 5,883,901 A | 3/1999 | Chiu et al. | |
| 6,141,753 A * | 10/2000 | Zhao | G06T 1/0021 380/277 |
| 6,157,377 A | 12/2000 | Shah-Nazaroff et al. | |
| 6,157,830 A | 12/2000 | Minde et al. | |
| 6,172,673 B1 | 1/2001 | Lehtinen et al. | |
| 6,184,918 B1 | 2/2001 | Goldschmidt Iki et al. | |
| 6,308,328 B1 * | 10/2001 | Bowcutt | H04L 29/06 725/110 |
| 6,377,938 B1 | 4/2002 | Block et al. | |
| 6,411,725 B1 * | 6/2002 | Rhoads | G06F 17/30876 375/E7.089 |
| 6,442,285 B2 | 8/2002 | Rhoads et al. | |
| 6,628,325 B1 | 9/2003 | Steinberg et al. | |
| 6,754,822 B1 | 6/2004 | Zhao | |
| 7,103,096 B2 | 9/2006 | Mitlin et al. | |
| 7,191,389 B1 | 3/2007 | Eryurtlu | |
| 7,536,705 B1 | 5/2009 | Boucher et al. | |
| 7,600,029 B1 * | 10/2009 | Mashinsky | H04L 41/5009 709/228 |

FOREIGN PATENT DOCUMENTS

| | | | | |
|---|---|---|---|---|
| SE | WO 0033511 A1 * | 6/2000 | ......... | H04L 12/2602 |
| WO | WO 00/11867 | 2/2000 | | |
| WO | WO 00/33511 | 8/2000 | | |

OTHER PUBLICATIONS

Ex parte Thomas Weidenfeller, decision of the Patent Trial and Appeal Board, Appeal 2014-003392, U.S. Appl. No. 10/237,461, pp. 1-6.*
Final Office Action, Dec. 20, 2012, U.S. Appl. No. 10/237,461, pp. 1-21.*
ITU-T-H.323-199611 Series H: Audiovisual and Multimedia Systems Infrastructure of audiovisual services—Systems and terminal equipment for audiovisual services 6ISUAL Telephone Systems and Equipment for Local Area Networks Which Provide a Nonguaranteed Quality of Service.
Dittmann et al; Content-based Digital Signature for Motion Pictures Authentication and Content-Fragile Watermarking; GMD—German National Research Center for Information Technology Institute (IPSI) 07-7695-0253 1999 IEEE; pp. 209-213.
Postel, user Datagram Protocol, IETF RFC 0768, Jan. 1996.
Schulemnne et al, "A Transport protocol for real-time applications", IETF RFC 1889, Aug. 28, 1980.
1st Project "M31"Fact Sheet, Market Managed Multi-Service Internet, http://dbs.cordis.lu/fep-cgilsrchidadb?...PROJ&RCN=EP_RCN_A:54480&CALLER=PROJ_11.
Market Managed Multi-service Internet M31 "Charging and Accounting System (CAS) Design", version 1.01, European Fifth Framework Project IST-1999-11429.
Upstream Link for High-bandwidth Digital Content Protection, rev. 1.00, Mar. 1, 2001, ISBN 0-9675129-8-0.
High-bandwidth Digital Content Protection System, rev. 1.0, Feb. 17, 2001, ISBN 0-9675129-4-8.

* cited by examiner

INFORMATION PRESENTATION DEVICE AND METHOD

PRIORITY CLAIM

This patent application is a continuation of co-pending U.S. application Ser. No. 10/237,461 filed on Sep. 9, 2002 which claims priority to EP patent application serial number 01120783-4, filed on Sep. 10, 2001.

TECHNICAL FIELD OF THE INVENTION

The present application relates to an information presentation device for presenting information to a user, where said information presentation device is arranged to receive information transmissions from a remote information source, and furthermore relates to a corresponding information presentation method and an information transmission method for controlling the transmission of presentation information from a remote source to an information presentation device.

BACKGROUND OF THE INVENTION

The presentation of information received from a remote information source in an accordingly arranged device is a well-known technical concept, e.g. in television and radio. An information presentation device of this kind will typically contain an information transmission receiver for receiving information transmissions, an information extractor for extracting presentation information that is to be presented, from such a received information transmission, and finally an information presenter for presenting the extracted presentation information.

Depending on the specific method of transmission between the remote source and the presentation device, the transmission receiver will be appropriately arranged. For example, if the information transmission is sent via a radio link, then the information transmission receiver shall have an antenna and appropriate receiving hardware. Alternatively, if the information transmissions are sent over a wire-bound network, then the information transmission receiver shall be appropriately arranged to receive such signals, i.e. will be connected to the wire-bound network in suitable fashion.

Equally, the extracting of presentation information, which can e.g. be an audio signal, a video signal or any mixed form of multimedia signal, will be conducted in accordance with the specific transmissions scheme employed. For example, if the transmission signal is an analogue signal, then the information extractor will be arranged to process the analogue signal (e.g. a frequency modulated radio) in order to extract the presentation information (e.g. an audio signal). As another example, an information extractor can also be a digital player, such as a video reproduction device that is arranged to receive a digital stream (e.g. coded in MPEG 3 or 4) and arranged to output a suitable signal (e.g. an RGB signal) for an information presenter, such as a TV or computer screen.

Finally, similar to the information transmission receiver and the information extractor, the information presenter will also depend on the type of information being presented, e.g. can be an audio interface (such as a loudspeaker and underlying hardware) if an audio signal is to be presented, a video interface (such as a screen and its underlying hardware) if a video signal is to be presented, etc.

A multitude of different concepts is employed in connection with the above-described basic idea of conveying presentation information from a remote source to an appropriate presentation device. For example, there exists the concept of broadcasting, which means that a source simply sends out information transmissions to a certain area (where said area can be defined physically as a transmission range, or logically as a certain set of addresses reachable in a network using an addressing scheme), where it is up to prospective receivers to "tune-in" to such transmissions, or the concept of multicasting, where a source sends out transmissions to a restricted plurality of destinations, or the concept of unicasting, where a source sends out a transmission to one destination. Naturally, the implementation of such concepts depends on the transmission technology used between the source and the receiving presentation device.

In order to ensure that the transmission from a source to a receiver is conducted appropriately, a number of mechanisms are known, such as forward error correction (FEC), which means that the source tries to appropriately prepare the signal being sent to the receiver such that it may be correctly received, e.g. by appropriately adjusting that transmission power or by introducing redundancy, and backward error correction, which implies communication from the receiver to the sender regarding errors, the most prominent example of which is automatic retransmission request (ARQ), which means that the receiver makes a determination whether a signal has correctly been received, and if not, automatically requests the sender (or source) to retransmit.

Beyond the well known concept of ARQ, which is implemented at the transmission receipt level, and ensures that the signal directly received at the input is indeed identical to what the sender (source) transmitted, it is also known to perform a type of service quality monitoring in a system consisting of a source and a receiver, where subsequent processing of the received input signal is also taken into account. Namely, ITU-T recommendation H.323 (11/96) proposes a maintenance loop-back mechanism according to which a received media stream, after it has been decoded by a codec, is looped back into the sending terminal of the codec, in order to be sent back to the source entity, such that the source entity can perform quality control.

In recent years, the advent of digital packet-based communication networks, such as the Internet, has led to extensive efforts for implementing systems of conveying presentation information from a remote source to an information presentation device over such a network. For example, Internet radio and Internet TV are already in use. Especially in connection with Internet TV, there are ongoing activities for implementing more sophisticated concepts and features than simple broadcasting. For example, protection against copying or eavesdropping is an issue, as e.g. discussed in connection with the High Bandwidth Digital Content Protection system, information on which is available at www-.digital-ct.com, ISBN 0 9675129-4-8. Another issue is that of performing accounting for content sent over the Internet. The article "Internet accounting", by Aiko Pras et al., in IEEE Communication Magazine, May 2001, pages 108-113 summarizes such efforts. In this article is e.g. discussed to provide a system referred to as "billing after acknowledgements", which means that a stream of information that is to be sent from a source to a paying receiver is divided into a plurality of "units", where a unit may be defined in terms of data amount or as a unit of time, and after the sending of a given unit, the subsequent units are only sent if an appropriate acknowledgement for billing is received from the receiver to the billed.

There is, therefore, a need for an improved system of conveying presentation information from a remote source to an information presentation device of the above-described kind.

SUMMARY OF THE INVENTION

In accordance with the present invention, the need for an improved system of conveying presentation information from a remote source to an information presentation device is solved by an information presentation device having the features of the attached claims, by an information presentation method having the features of the attached claims, and by an information transmission method having the features of the attached claims. Advantageous embodiments are described in the dependent claims.

In accordance with the present invention, in an information presentation device that has an information transmission receiver, an information extractor and an information presenter, a monitor is provided where said monitor is arranged to monitor the operation of one or both of the information extractor and the information presenter, determine whether the operation of one or both of the information extractor and the information presenter fulfils one or more predetermined conditions, and generate an operation condition signal destined for the remote information source, where said operation condition signal conveys an indication of the fulfillment or non-fulfillment of said one or more conditions.

In other words, the present invention introduces a monitoring element that can generate feedback for the transmission source, without however sending back the entire received presentation information, as proposed in H.323. In fact, the concept of the present invention is highly advantageous with respect to the loop back mechanism proposed in H.323, as the system of the present invention implements a monitoring part at the receiver side and thereby already performs monitoring processing at the receiver side, such that the amount of feedback information to be sent to the transmission source can be greatly reduced. For example, if only one condition is monitored, such as the simple question whether any information is being presented at all (e.g. any sound is being played, or any picture is being displayed), this can e.g. be sent back to the transmission source as a single bit, namely 0=yes and 1=no (or vice versa).

On the other hand, the teaching of the present invention is also quite distinct from the concept of ARQ, as the concept of ARQ is employed at the receiver level, without any regard to subsequent processing, whereas the present invention specifically monitors one or both of the extraction (e.g. decoding, transcoding, etc.) and presenting (e.g. display) of presentation information in the processing subsequent to receiving a transmission signal. In fact, the monitor of the present invention is preferably implemented to monitor the operation as late as possible in the information presentation chain, i.e. as close as possible to the last presentation element. For example, this can be a screen device, such as a CRT, LCD screen, plasma screen, etc. in the case of presenting video or picture information.

Preferably, the teaching of the present application is employed in connection with a packet based communication network, such as the Internet, where the presentation information, e.g. media streams, are transported with an unreliable protocol, such as UDP (User Datagram Protocol; RfC 768), which does not provide an ARQ mechanism. The present invention can then ensure a reliable quality and performance monitoring, without placing a burden on network transmission resources. Namely, due to the employment of an architecture in which the monitoring and related processing is done at the side of the information presentation device, it is not necessary to transmit large amounts of feedback information to the transmission source. Nonetheless, the remote transmission source can receive information on the operation at the presentation device, and appropriately conduct its own transmission control procedure, e.g. perform billing accordingly, or interrupt the further transmission under certain conditions, e.g. if no operation condition signals are received from the receiving presentation device.

It should be pointed out that the implementation of the present invention does not require that the operation condition signal be sent to the transmission source by the same means as the transmission source sends its transmission signals to the information presentation device. For example, the present invention can also be employed in a system where the information transmissions from the information source are sent via one transmission mechanism (e.g. from an earth station to a satellite, and from a satellite via broadcast to individual receiver antennas), and the operation condition signal is sent to the information source along another, distinct path e.g. via a telephone connection. However, it is preferable that the invention be applied in the context of a transmission system that allows communication from the information source to the presentation device and from the presentation device back to the source, as e.g. provided by digital packet-based network, such as the Internet.

The one or more conditions monitored by the monitor of the invention can be determined or selected in any suitable or desirable way, as it is appropriate for the specific application and the accompanying requirements. For example, it is possible that one of the one or more conditions is a condition that is fulfilled if the information extraction and/or information presentation is taking place at all. Another possibility is that one of the one or more conditions is fulfilled if the presence of one or more characteristic markings is detected in the presentation information. For example, such a marking can be a specific logo embedded in video information, or can be data that is contained in the presentation information but not presented to a user of the presentation device, such as a digital watermark, i.e. a predetermined digital pattern in the presentation information.

It may be noted that although the present document speaks of a receiver, an extractor, a presenter and a monitor, such elements should be understood as being provided in any suitable way, namely in the form of hardware or software, or any suitable combination of hardware and software. Equally, the information presentation device of the present invention can be provided by hardware or any suitable combination of hardware and software.

Other features and advantages of the present invention shall be apparent to those of ordinary skill in the art upon reference to the following detailed description taken in conjunction with the accompanying drawings.

BRIEF DESCRIPTION OF DRAWINGS

In the following, the present invention shall be described on the basis of detailed embodiments, making reference to the figures in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not limit the scope of the invention.

Figure 1:
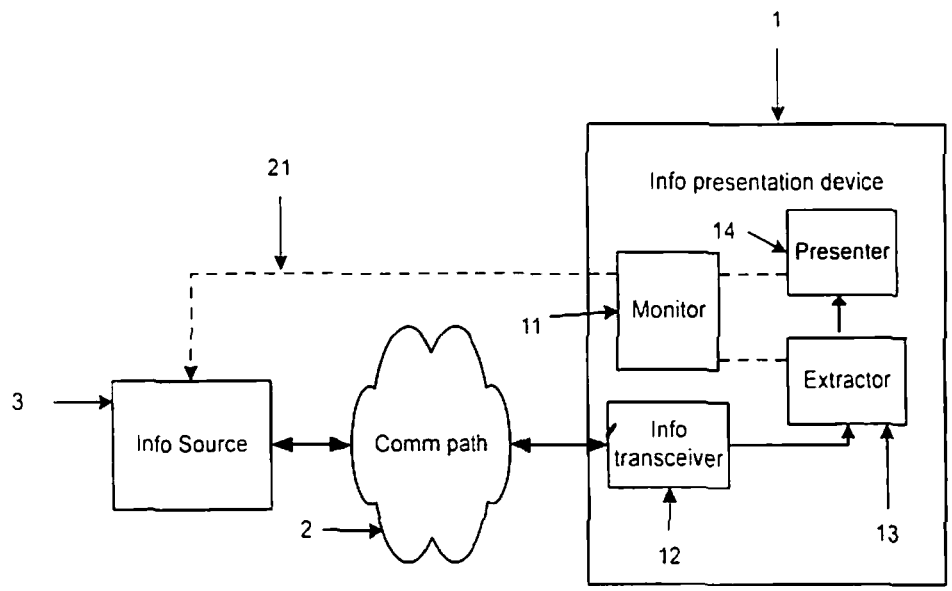
FIG. 1 shows a schematic block diagram of a general embodiment of the present invention.

FIG. 1 shows a schematic representation of an embodiment of the present invention. Reference numeral 1 refers to an information presentation device for presenting information to a user. The information presentation device 1 receives information transmissions sent by a remote information source 3 over a communication path 2. The information presentation device 1 comprises an information transmission receiver 12, which is arranged to receive the information transmissions sent via the communication path 2. Furthermore, an information extractor 13 is provided, for extracting presentation information from a received transmission, and an information presenter 14 is contained in the information presentation device, for finally presenting the extracted information to a user.

The specific details of each of the above-mentioned elements will depend on the specific technology employed and the specific requirements. Therefore, the terms receiver, extractor and presenter are to be understood in a non-limiting way. Namely, the receiver 12 can be a radio receiver arranged to demodulate a modulated transmission signal, in order to output an intermediate frequency (IF) signal to the extractor, where the extractor is then arranged to process the IF signal in order to generate a signal that can be processed by the presenter 14. Using an audio transmission as an example, the extractor will be a device that extracts or derives the audio frequency signal from the IF signal, and provides this audio frequency signal to the reproduction hardware, i.e. a loudspeaker. On the other hand, the information transmission receiver 12 can also be a network interface arranged to receive packets from a packet-switched communication network 2, in order to output an appropriately decoded media stream (e.g. a media stream in accordance with MPEG3 or 4) to the extractor 13, which in this case would be a media player that in turn can convert the media stream into a signal suitable for the presenter, e.g. into an RGB signal for a display device.

Therefore, in general, the extractor will be an element for converting a received signal into a format suitable for presentation by the presenter.

In accordance with the present invention, a monitor 11 is provided, where the monitor 11 is arranged to monitor the operation of the information extractor 13 and/or the information presenter 13. This is indicated by the dashed lines between elements 11, 13 and 14. The content monitor can therefore monitor the operation of the extractor 13 by itself, of the information presenter 14 by itself, or of both. Preferably, the monitor 11 monitors the operation of the information presenter 14, e.g. the element in the presentation chain that is as closest possible to the final point of presentation.

The monitor 11 furthermore determines whether the operation of one or both of the information extractor 13 and the information presenter 14 fulfils one or more predetermined conditions. As already mentioned, the one or more predetermined conditions can be selected or determined as is desirable or suitable. For example, it can simply be monitored if any extraction and/or presentation is taking place at all.

Finally, the monitor 11 is arranged to generate an operation condition signal destined for the remote source 3, where said operation condition signal conveys an indication of the fulfilment or non-fulfilment of the one or more conditions.

In FIG. 1 the transmission of the operation condition signal to the transmission source 3 is represented by a dashed line arrow 21. This serves to indicate that the sending of the operation condition signal can be independent of the communication path 2 used for conveying information transmissions from the source 3 to the information presentation device 1.

Figure 2:
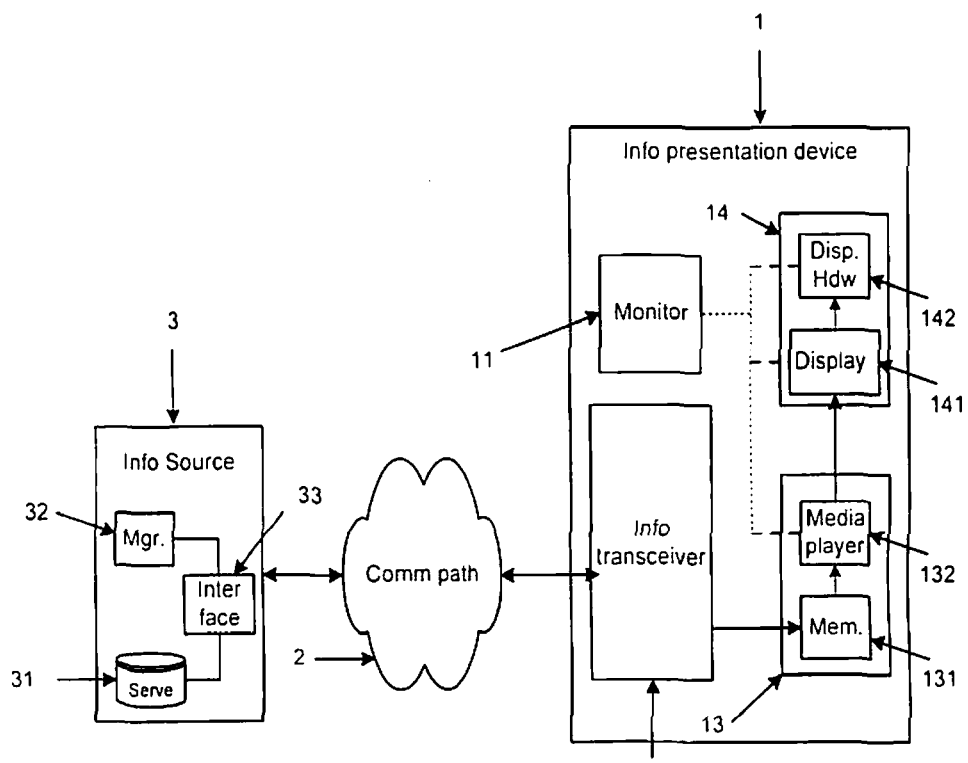
FIG. 2 shows a schematic block diagram of a preferred embodiment of the present invention.

Now a more detailed embodiment of the invention shall be described with respect to FIG. 2. The same reference numerals as in FIG. 1 shall refer to corresponding elements in FIG. 2. FIG. 2 shows the situation where the information source 3 and the information presentation device 1 are connected via a digital packet-switched network, such as the Internet. Consequently, the information transmission receiver 12 is an appropriate network interface. Equally, the transmission source 3, for example, a network server arranged to send media streams to clients, has an appropriate network interface 33.

As shown in FIG. 2, the monitor 11 is arranged to provide the operation condition signal to the network interface 12, such that the operation condition signal is sent to the transmission source 3 via the digital packet-switched network 2. The network interface 33 of the source 3 provides the operation condition signal to a manager or managing procedure 32, which is described in more detail further on.

The information presentation device 1 of FIG. 2 is shown in such a way that the information extractor 13 comprises a media player 132, which provides an appropriately processed presentation signal (e.g. an audio frequency signal for listening, and RGB signal for viewing, or an appropriate combination of both) to a memory 131, e.g. a frame buffer.

The memory 131 in turn is connected to the information presenter 14, which can specifically comprise a display 141 connected to appropriate display hardware 142. Alternatively, 141 can be an audio output device such as a loudspeaker, having appropriate hardware 142.

It may be noted that the individual elements shown in FIG. 2 can be provided as hardware, software or any combination of hardware and software. For example, the information presentation device 1 can be a unit, such as a personal computer, a personal digital assistant or similar device, but can also consist of separate physical devices, such as a set-top box (containing the network interface 12, the player 132 and the memory 131) and a conventional television set (containing the display/speaker 141 and appropriate hardware 142). The output of the network interface 12 to the player 132 may be referred to as the content or payload of the received information transmission, i.e. the result of separating the transmission specific signaling, coding, or encapsulation from the received signal, and the output from the player 132 to the memory 131 can be referred to as a play signal suitable for the presenting device 14.

The monitor 11 can be provided as software, hardware or a combination of hardware and software. In other words, it can e.g. be provided in conjunction with the extractor 13 (or player 132) or in conjunction with the presenter 14. The functions of the monitor can also be spread out over several elements, e.g. the receiver, extractor and presenter, and over several physical units.

In the following, examples of the operation of the embodiment of FIG. 2 shall be explained and possible applications shall be presented.

A basic feature of the present invention is that the remote information source 3 receives a form of feedback regarding the extraction and presentation of the presentation information (or content) at the information presentation device. As already mentioned, this information should be generated as late as possible in the transmission/presentation chain. The later the information is generated, the more of the involved network and equipment is covered.

Depending on the specific type of information presentation device being used, the latest part in the transmission chain that can easily be reached/accessed, e.g. via appropriate software, is for example:
- a memory, in which the decoding of the incoming data stream takes place,
- a frame buffer, if an appropriate digital device is used for reproduction,
- a display (such as CRT or LCD screen) itself, if appropriately arranged with suitable hardware and software, or
- the output of some hardware equipment that decodes the incoming presentation information.

FIG. 2 shows an example, where one or more of the frame buffer 131 and the hardware 142 and the final output element 141 is monitored.

The monitor 11 monitors the operation and determines whether one or more predetermined conditions are fulfilled. For example, the monitor can look for changes in the presentation information signal, e.g. changes in the frame buffer (or in some part of the frame buffer), in order to determine if any presentation is taking place at all. If such changes indicate that the presentation information or content is indeed being played, the monitor will send a corresponding operation condition signal for the server 3, via the network interface 12, the network 2 and the network interface 33. If the content provider 3 does not receive such an acknowledgement in regular intervals, he may stop the further transmission of information, and conduct appropriate further steps in an information transmission procedure e.g. reimburse the user (customer) of the information presentation, in the event that the transmission of presentation information is charged to the user.

If the operator of the server 3 embeds specific identifier patterns or characteristic markings in the presentation information, then such characteristic identifiers or markings can be used in order to simplify the monitoring of the presentation information or content. Such markings may be added specifically for the purpose of applying the present invention, or the present invention can also make use of characteristic markings already present in the signals for other purposes. For example, it is possible that every n-th frame of a video might contain a sign/logo in some corner of the image. Then the monitor will determine whether this sign/logo is present or not, and generate an appropriate operation condition signal. It is also possible to embed some special marks in an audio stream e.g. into an MP3 encoded song. Another possibility is the use of a digital watermark, which has the advantage that the digital watermark can be used both for monitoring in accordance with the present invention, as well as content protection. Naturally, a variety of markings can be used in conjunction with one another, in order to enhance performance.

As an example, the processing conducted by the monitor 11 can then consist in analysing the signal being monitored with reference to the characteristic marking (e.g. extract the section of the image in which the logo should be present, or perform a decoding for extracting a bit sequence that should be the digital watermark), and perform a comparison with a stored reference. If the analyzed part of the signal being monitored and the reference agree to a predetermined degree (100% agreement may not be necessary, and the setting of the degree of agreement to lower values provides a corresponding tolerance to errors that are judged acceptable), then a corresponding operation condition signal indicating that the characteristic pattern has been identified is generated. If the predetermined degree of agreement is not detected, then according to a preferred embodiment, a corresponding operation condition signal indicating that the characteristic pattern has not been identified is generated. As an alternative, the monitor could also simply abstain from generating any signal in such a case. Such an operation condition signal could be a single bit that simply indicates "characteristic pattern identified" or "characteristic pattern not identified", but could also carry more information, such as the degree of agreement, which in turn could e.g. also serve as a quality indicator, where e.g. a high degree of agreement indicates a high quality, and a low degree of agreement a low quality. The stored reference could be a fixed reference pattern set in or for the monitor 11 initially at production, e.g. in a smart-card, or could be a reference pattern that can be dynamically updated via the network 2.

Preferably, the server 3 will stop sending further information transmissions if the operation condition signal is not received within an expected period. The "expected period" can be set as is appropriate for the technical context. Namely, in the example of FIG. 2, in which the operation condition signal is sent via packets from the information presentation device 1 to the server 3 over the packet-switched network 2, the monitor 11 will be arranged to generate such operation condition signal packets at a certain rate, such that the server 3 will expect to receive the packets in accordance with said rate, where it is e.g. also possible to take into account the possibility that a certain number of such packets is lost or delayed during transmission. In other words, this provides a certain tolerance for problems that might occur in the transmission of the operation condition signal to the source 3.

Preferably, the concept of the present invention is applied to a system of providing pay-per-view services to clients over a packet-switched network, where the media streams sent by said pay-per-view service are conveyed using a protocol that does not employ ARQ, e.g. are sent via UDP, for example under the control of RTP (real-time protocol; RfC1889). It should be noted that the term "pay-per-view" is not to be understood as being restricted to visual information, but refers to any type of information that a user must pay for to receive.

The operation condition signal is used by the server 3 for conducting a transmission control procedure that comprises a billing operation for transmitted presentation information. Namely, billing is conducted as long as operation condition signal packets are received, and equally, the transmission of presentation information by the server 3 is continued as long as operation condition signal packets are received. In other words, if the transmission condition signal is not received, the further transmission of presentation information is discontinued. This provides a tamper-proof system, because trying to prevent sending the operation condition signal on the part of the user of the information presentation device simply results in a discontinuation of the service. On the other hand, producing false operation condition signals does not provide any advantage, as this means that a billing for the service will be conducted.

Although the application to billing in a pay-per-view scheme is a preferable application, the system of the present invention can also be employed in other ways, for example for monitoring the general presentation performance. Namely, the operation condition signal can also provide more detailed information in the sense of letting the source 3 have information on the specific quality obtained at the information presentation device. An example was given above, in which the degree of agreement between a marking in the signal being monitored and a reference characteristic marking can serve as a quality indication. Naturally, a quality indication can be chosen in any suitable or desirable way, depending on the technology being employed and the type of signal being monitored. Therefore, as another example, if the signal being monitored is an audio frequency signal, then the dynamic range could be measured and output as a quality indicator. This quality feedback indication can then be used by the source 3 in a variety of ways, e.g. to change the quality (e.g. in the form of FEC or by adding/deleting layers in a system using enhancement layers) of the input signal at the source side (e.g. increase the quality if the operation condition signal shows that the reproduction is below a certain threshold quality level, or decrease the quality in order to save resources on the network if the operation condition signal shows that the reproduction quality exceeds certain predetermined thresholds). Equally, the quality indication can be used in conjunction with billing e.g. if the reproduction quality in the information presentation device is below a certain quality threshold, then the billing rate may be reduced.

Any such processing for managing the transmission of presentation information and accompanying managing functions (such as billings) can be conducted by the managing entity 32 shown in FIG. 2.

Figure 3:
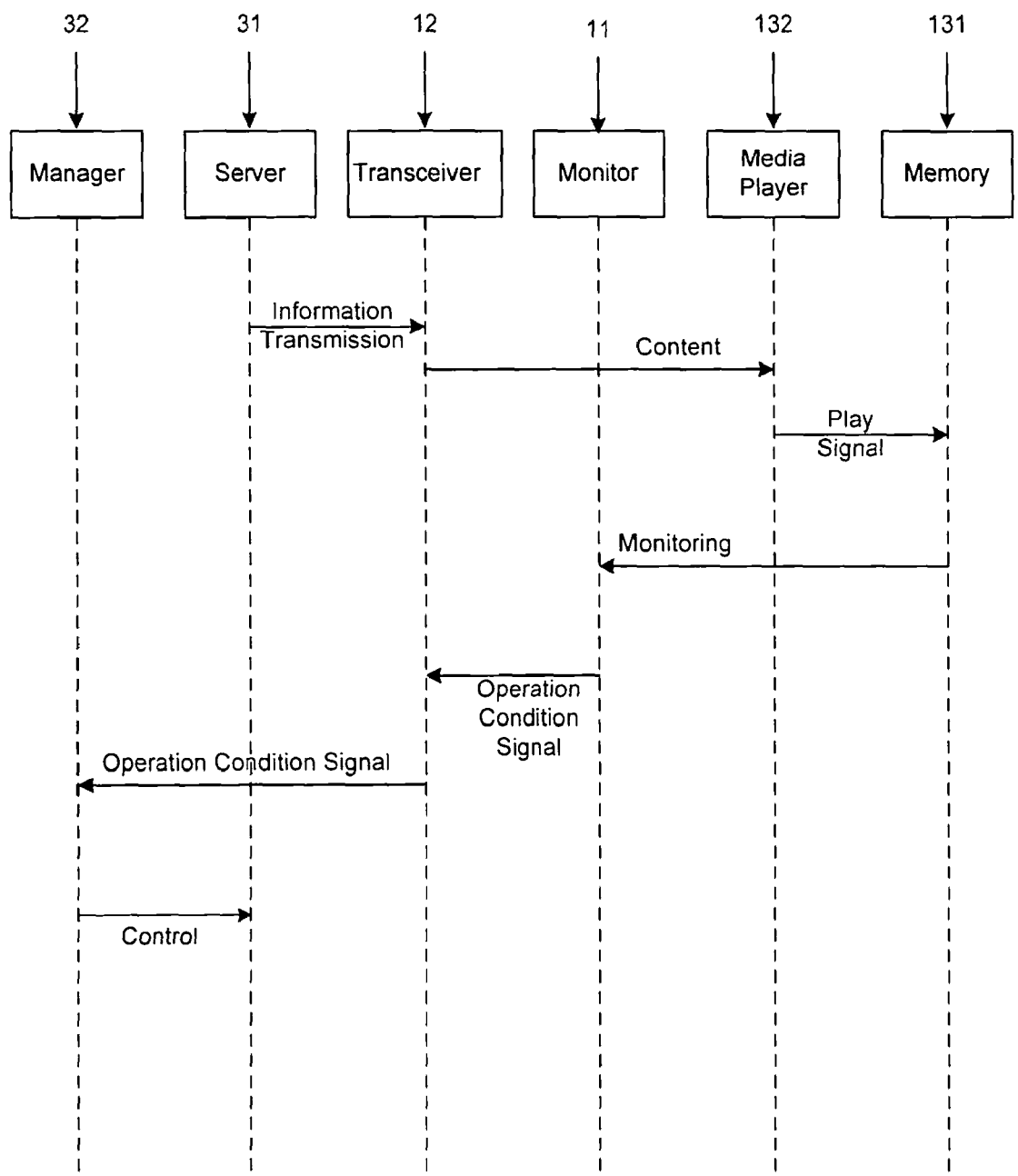
FIG. 3 shows an example of a signal exchange in accordance with an embodiment of the present invention.

FIG. 3 shows a simple example of a full round trip of streaming, monitoring and operation condition signal information, where the frame buffer is used as an example of an element being monitored by the content monitor 11. As can be seen, an information transmission takes place from the server 31 to the receiver 12. The receiver 12 separates the payload or content from the received signal, e.g. by removing the encapsulation or segmentation imposed by a transmission level protocol, or e.g. by demodulating a received signal, and passes this content to the player 132. The player converts the content into a play signal, which is provided to the frame buffer 131, which is being monitored. A monitoring takes place between the frame buffer 131 and the monitor 11. This monitoring can e.g. consist in the simple analysis of checking whether there are any changes in the frame buffer at all, in order to check whether anything is being played, or can consist in a more complicated procedure, such as the examination of a predetermined part of certain frames in the frame buffer, in order to compare said frame part with a reference pattern and determine a degree of agreement. The monitor 11 then generates a corresponding operation condition signal, which is passed to the receiver 12, where it is suitably processed (e.g. coded, modulated, encapsulated, etc.) for being sent to the managing unit 32, which then accordingly controls the server 31.

The present invention, and especially the preferred embodiment described in conjunction with FIG. 2 provides a number of advantages and possible applications. Especially, it is possible to offer pay-per-view services over unreliable networks, such as the Internet. Up to the present, service providers, such as Internet TV stations and radio stations are reluctant to introduce pay-per-view services because of the unreliable nature of the Internet. Naturally, such problems exist in connection with any unreliable data transmission network.

Regarding the conducting of accounting over such an unreliable network as the Internet, the known solutions focus on the accounting itself, but not on how a "billing case" actually arises and is confirmed. In the above-mentioned article by Pras et al, it is assumed that the "acknowledgements" are generated in some appropriate way, and that these acknowledgements can be trusted. However, it is not indicated how this can be ensured. In contrast thereto, the present invention shows a trustable acknowledgement procedure, namely via the operation condition signal, where the basic control of transmitting content from the source or server 3 to the receiver 1 depends on said operation condition signal, and service can be discontinued if the operation condition signal is not received in an expected period.

Although the present invention has been described on the basis of detailed embodiments, these detailed embodiments are only presented in order to give the skilled person a thorough and complete understanding of the invention, and are not intended to restrict the invention. Much rather, the scope of the invention is defined by the appended claims, where reference numerals in the claims serve to make the claims easier to read, but do not restrict the scope.

What is claimed is:

1. A user equipment (UE) for presenting information to a user, arranged to receive multimedia signals from a network server, the UE comprising:
   receiver configured to receive multimedia signals from the network server;
   processing circuitry configured to extract audiovisual content to be presented, from at least one of the multimedia signals;
   the processing circuitry further configured to provide the extracted audiovisual content to a frame buffer;
   a user interface configured to present the extracted audiovisual content after retrieving it from the frame buffer; and
   a monitor configured to:
      monitor operation between the frame buffer and the user interface to determine whether there are any changes in the frame buffer, said changes indicating that the audiovisual content is being presented at the user interface; and
      generate an operation condition signal and provide said operation condition signal to the network server, said operation condition signal conveying an indication that the audiovisual content is being presented at the user interface and wherein the monitor is configured to automatically provide said operation condition signal at a predefined rate indicating that the audiovisual content is still being presented.

2. The UE according to claim 1, wherein:
said processing circuitry comprises a media player.

3. The UE according to claim 1, further comprising a network interface, said network interface being connectable to a packet based communication network and implementing at least one communication protocol for receiving multimedia signals in the form of data packets.

4. The UE according to claim 3, wherein said communication protocol does not provide an automatic repeat request (ARQ) mechanism.

5. A method for controlling user equipment (UE), the method comprising the steps of:
    receiving multimedia signals from a network server;
    extracting audiovisual content to be presented, from at least one of the multimedia signals;
    providing the extracted audiovisual content to a frame buffer;
    presenting the extracted audiovisual content via a user interface after retrieving it from the frame buffer;
    monitoring one or both of the extraction and the presentation of presentation information operation between the frame buffer and the user interface;
    determining whether one or more predetermined conditions are fulfilled by one or both of the extraction and the presentation of presentation information there are any changes in the frame buffer, said changes indicating that the audiovisual content is being presented at the user interface; and
    generating an operation condition signal and providing said operation condition signal to the network server, said operation condition signal conveying an indication that the audiovisual content is being presented at the user interface, and wherein the operation condition signal is automatically provided at a predefined rate indicating that the audiovisual content is still being presented.

* * * * *